United States Patent
Chandler et al.

(10) Patent No.: US 6,213,476 B1
(45) Date of Patent: Apr. 10, 2001

(54) BI-MODULUS COMPOSITE SEAL AND ITS METHOD OF MANUFACTURE

(75) Inventors: Jon A. Chandler, Powell; Gary B. Drake, Convoy, both of OH (US); Stephen J. Carr, Redford, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/146,287

(22) Filed: Sep. 3, 1998

(51) Int. Cl.$^7$ ........................................... F16J 15/32
(52) U.S. Cl. .................. 277/569; 277/565; 277/566; 277/562; 277/571
(58) Field of Search .................... 277/569, 571, 277/565, 566, 562, 551, 309

(56) References Cited

U.S. PATENT DOCUMENTS

| | | | | |
|---|---|---|---|---|
| 4,274,641 | * | 6/1981 | Cather | 277/569 |
| 4,300,777 | | 11/1981 | Symons . | |
| 4,822,058 | * | 4/1989 | Butler et al. | 277/569 |
| 4,969,653 | * | 11/1990 | Breen | 277/569 |
| 5,183,271 | | 2/1993 | Wada . | |
| 5,431,872 | | 7/1995 | Sink . | |
| 5,577,741 | * | 11/1996 | Sink | 277/569 |
| 5,649,710 | * | 7/1997 | Kanda | 277/571 |
| 6,050,570 | * | 4/2000 | Otto | 277/569 |

* cited by examiner

Primary Examiner—Anthony Knight
Assistant Examiner—Enoch E Peavey
(74) Attorney, Agent, or Firm—Reising, Ethington, Barnes, Kisselle, Learman & McCulloch, P.C.

(57) ABSTRACT

A lip-type fluid seal (10) for a shaft includes a composite sealing lip (26) having an elastomeric portion (32) and a PTFE portion (36). The elastomeric portion (32) includes a lip edge (33) that extends circumferentially continuously to seal the adjacent lip edge (37) of the PTFE portion (36) from any contaminants on the elastomeric side (28) of the seal (10). The PTFE portion (32) has a greater hardness and modulus of elasticity which serves to limit the wear of the elastomeric portion (32) and to induce hydrodynamic surface deformations on the elastomeric lip portion (32) during operation to enhance the exclusion of contaminants. The PTFE lip edge (37) performs well under low temperature and/or low lubricity conditions and its relative hardness protects the elastomeric lip edge from excessive wear.

18 Claims, 3 Drawing Sheets

BI-MODULUS COMPOSITE SEAL AND ITS METHOD OF MANUFACTURE

BACKGROUND OF THE INVENTION

1. Technical Field

This invention relates generally to radial lip seals for use with relatively rotatable members such as wheel axle applications, and in particular to lip seals wherein the contacting lip is formed of two dissimilar materials.

2. Related Prior Art

Lip-type fluid seals typically employ a flexible sealing member that is fixed to an outer metallic case and includes one or more sealing lips along a radially inward edge thereof. The selection of the sealing member material is determined by a number of factors, including the environment in which the seal will be operating. Elastomeric materials, such as rubber, are often employed as the sealing lip material in applications where the lip seal is exposed to a dirty environment. For example, seals used in heavy equipment applications for sealing axle bearings are exposed on the air or atmosphere side of the seal to various contaminants which would be harmful to the bearings, including water, salt, and abrasives such as dust, mud, sand, etc. In other applications, contaminants may be present in lubricant on one side of the seal. In either case, elastomers are generally preferred as the sealing lip material over other materials, such as polytetrafluoroethylene (PTFE) materials, as the elastomers are far more resistant to wear under such contaminated conditions than those of the PTFE materials, which generally perform poorly.

Environmental conditions which favor PTFE materials over the elastomers for the selection of the sealing member include low and high temperature and/or dry or low lubricant running conditions. The PTFE materials are generally more wear resistant than elastomers under such conditions.

Difficulties arise, however, when seals operate in environments that favor neither material. For example, in the heavy equipment application described above, it is not uncommon for the seal to be subjected not only to a contaminated environment, but also to low or high temperature and/or low lubricity conditions. In the past, the elastomers were selected over PTFE materials, as the elastomers are more tolerant of low or high temperature and/or low lubricity conditions than are the PTFE materials of a contaminated running condition. Thus, there is a need in the industry for a lip seal that performs well in a contaminated environment and low or high temperature and/or low lubricity operating conditions.

SUMMARY OF THE INVENTION AND ADVANTAGES

A fluid seal assembly for a relatively rotatable member having a cylindrical sealing surface comprises a rigid annular case, a sealing member formed of elastomeric material fixed to the case including an annular seal lip having a contaminated side and an opposite side and an annular elastomeric lip portion disposed on the contaminated side having an annular elastomeric lip edge supported for sealing engagement with the sealing surface of the relatively rotatable member. The invention is characterized by the sealing lip including an insert formed of PTFE material bonded to the elastomeric lip portion in axially adjacent relation thereto on the opposite side of the sealing lip having an annular PTFE lip edge supported for simultaneous sealing engagement with the sealing surface of the relatively rotatable member.

According to a further aspect of the invention, a unitized fluid seal assembly is provided having an outer metal case, an inner wear sleeve, a sealing member having a body formed of elastomeric material fixed to the case including a radially inwardly projecting annular sealing lip having a contaminated side and an opposite side and an elastomeric lip portion having an annular elastomeric lip edge disposed on the contaminated side in sealing engagement with the wear sleeve. The invention is characterized by the sealing lip including a PTFE insert bonded to the lip portion and having an annular PTFE lip edge disposed on the opposite side in simultaneous sealing engagement with the wear sleeve and sealed from the contaminated side by engagement of the elastomeric lip portion with the wear sleeve.

The invention also contemplates a method of manufacturing such fluid seals wherein a PTFE insert is bonded to an elastomeric lip portion to provide a PTFE lip portion. The elastomeric and PTFE lip portions are trimmed to provided common axially adjacent elastomeric and PTFE lip edges disposed on the contaminated and opposite sides, respectively of the seal and supported for simultaneous sealing engagement with a sealing surface of a relatively rotatable member.

The invention thus provides a fluid seal having a sealing lip with a composite elastomeric/PTFE lip edge. The elastomeric lip edge is disposed on the contaminated side of the lip and the PTFE lip edge is disposed on the opposite side of the lip and are support for simultaneous contact with the corresponding sealing surface of a relatively rotatable member, such as a wear sleeve.

Such a composite seal configuration is particularly well suited in applications where the operating conditions favor neither a lip seal fabricated of only elastomeric or PTFE material. In a heavy equipment axle bearing seal application, the elastomeric lip edge on the contaminated side of the sealing lip is exposed to contaminants during operation, while the PTFE lip edge is on the opposite side shielded from the contaminating atmosphere by the elastomeric lip edge. In operating conditions where, in addition to the contaminating environment, there exists also low or high temperature and/or low lubricity operating conditions, the PTFE lip edge comes into play to maintain a good fluid seal with the sealing surface of the relatively rotatable member. The simultaneous contact of the wear-resistant PTFE lip edge advantageously limits the degree of wear of the elastomeric lip edge to that of the PTFE lip edge, thereby enabling the elastomeric lip edge to continue shielding the PTFE lip edge from contaminants even under unfavorable conditions of extreme temperatures and/or low lubricity conditions.

A further advantage of the PTFE/elastomeric lip edge combination is that the PTFE material has a higher modulus of elasticity than that of the elastomeric material. During operation, reversible hydrodynamic surface deformations are imparted to the elastomeric lip portion to assist in the exclusion of contaminants. It has the further advantage of providing such hydrodynamic aids without having to form them during the manufacturing process. This simplifies the manufacture of such seals, particularly those requiring bi-directional hydrodynamic capabilities. Still a further advantage is that the bi-modulus imparted hydrodynamic surface deformations are not permanent like those of the molded, embossed, or cut type, which are prone to entrapping contaminants thereby reducing the effect of the hydrodynamic features and in some cases causing premature wear of the seal and/or scoring of the sealing surface of the relatively rotatable member.

BRIEF DESCRIPTION OF THE DRAWINGS

These and other advantages and features of the invention will be readily appreciated as the same becomes better understood by reference to the following detailed description when considered in connection with the accompanying drawings, wherein.

DETAILED DESCRIPTION

Figure 1:
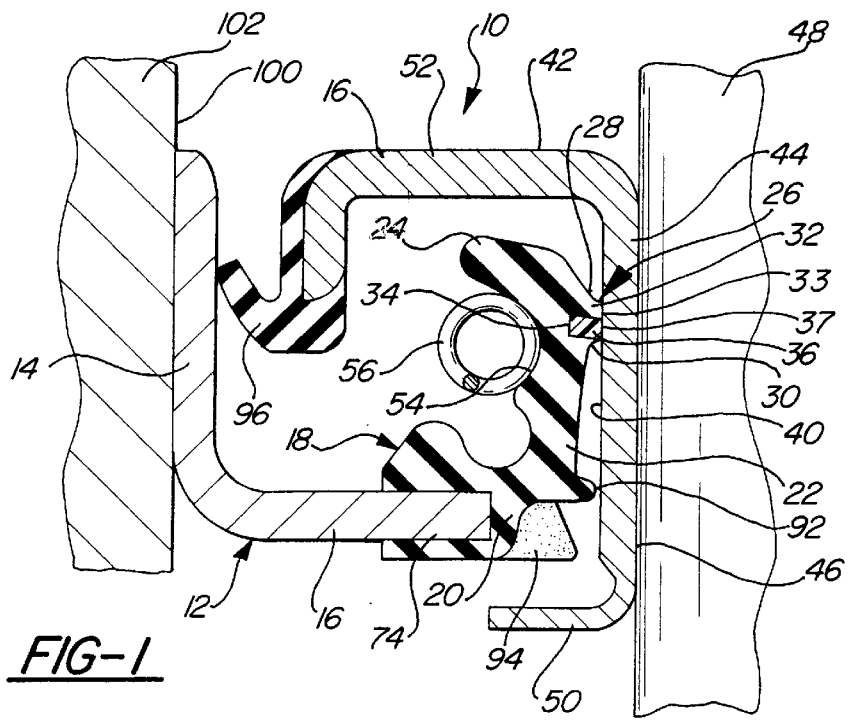
FIG. 1 is an enlarged radial sectional view of a portion of a composite bi-modulus lip seal constructed according to a presently preferred embodiment of the invention and shown installed in a wheel axle application.

Referring now in more detail to the drawings, there is shown in FIG. 1 a lip-type fluid seal assembly generally designated 10, having a rigid annular case or carrier 12 in the preferred form of a cylindrical cup-shaped metallic shell having a cylindrical wall 14 and a radial flange portion 16.

An annular sealing member, generally indicated at 18, is fixed to the flange portion 16 of the case 12 and may be formed of any suitable elastomeric material, such as silicone, polyacrylate, fluoroelastomer, ethylene acrylic, or nitrile elastomer. The member 18 has an elastomeric body portion 20 fixed to the flange 16, an elastomeric flex section or neck 22, and an annular elastomeric head section 24. An annular sealing lip 26 extends radially from the head 24 and includes a contaminated side 28 and an axially opposite side 30, corresponding to the orientation of the seal in its operating environment for a given application. The opposite side 30 is that side of the sealing lip 26 which faces a fluid or grease reservoir or protected air environment from which the seal is intended to protect from contaminants, and the contaminated side 28 is that side of the sealing lip 26 from which the contaminants, such as dust, dirt, sand, road grime, salt, water, etc. are intended to be excluded from entering the fluid reservoir past the sealing lip 26 and may be a contaminated air environment or a contaminated lubricant or fluid. For simplicity, in the description of the embodiment that follows, the contaminated side 28 will be referenced as the air side 28, and the other protected side 30 will be referenced as the oil side 30, it being understood that the contaminating environment can be other than air.

The sealing lip 26 is of a composite construction and includes an elastomeric lip portion 32 provided on the air side 28 of the sealing lip 26 and, according to the invention, a nonelastic insert 34 formed of polytetrofluoroethylene (PTFE) material bonded to the elastomeric lip portion 32 in axially adjacent relation thereto on the fluid side 30 of the sealing lip 26.

The elastomeric lip portion 32 includes an annular elastomeric lip edge 33, and the PTFE insert 34 includes a PTFE lip portion 36 with an annular PTFE lip edge 37. The elastomeric lip edge 33 is disposed on the air side 28 of the sealing lip 26, while the PTFE lip edge 37 is disposed on the fluid side 30 in axially spaced relation to the air side 28. The elastomeric lip edge 37 extends circumferentially continuously so as to shield the PTFE lip edge 37 from the air side 28. The PTFE lip edge 37 is likewise preferably circumferentially continuous and as such the sealing lip 26 is provided with a composite contact sealing surface having a continuous band of elastomeric material on the air side and a continuous band of PTFE material on the oil side. The elastomeric and PTFE materials are intimately bonded and as such they are joined across a common interface 38 such that the elastomeric lip edge 33 transitions without interruption into the PTFE lip edge 37 in the axial direction.

Figure 2:
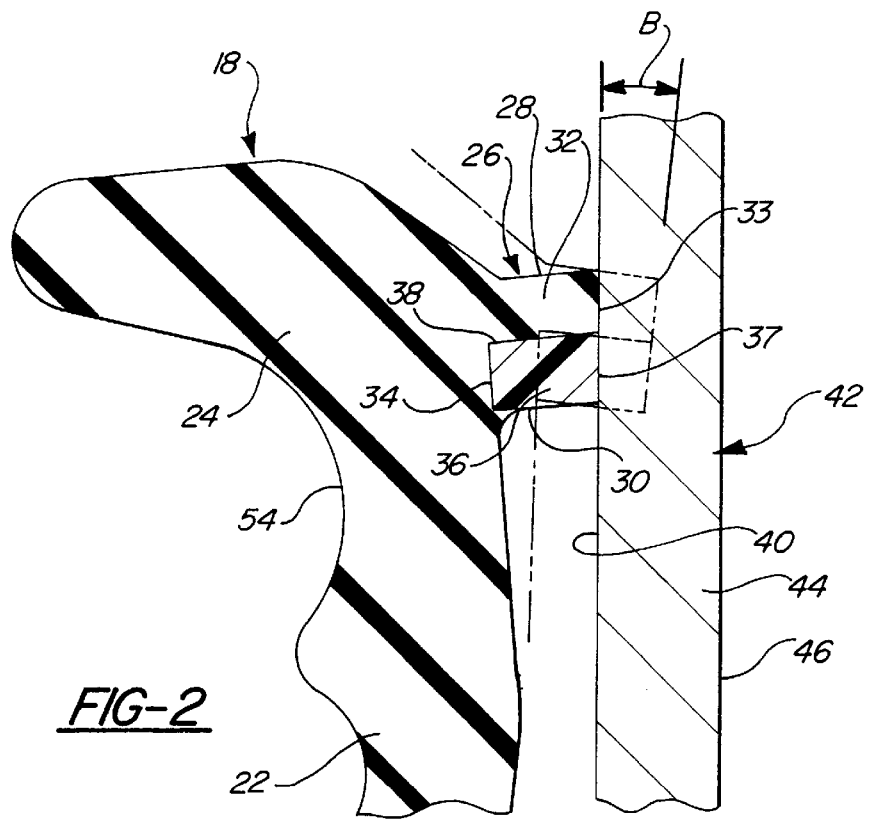
FIG. 2 is a further enlarged fragmentary sectional view of a portion of the lip seal of FIG. 1.

The elastomeric and PTFE lip edges 33, 37 are supported by the sealing member 18 in such manner as to simultaneously sealingly engage a cylindrical sealing surface 40 of a relatively rotatable member 42. According to a preferred embodiment of the invention, the relatively rotatable member 42 comprises a unitized wear sleeve 42 of the well known type having a cylindrical body or sleeve section 44, the inner periphery 46 of which is dimensioned to fit snuggly on a shaft 48, and the outer periphery of which serves as the sealing surface 40 upon which the lip edges 33, 37 run, as illustrated in FIGS. 1 and 2. The wear sleeve 40 is curved outwardly at its ends to provide radially outwardly extending end flanges 50, 52 on the fluid and air side 30, 32 of the sealing lip 26, respectively. In this way, the wear sleeve 40 is joined with the case 12 and sealing member 18 as a unitized assembly.

The sealing member 18 is molded with an annular spring retention groove 54 adapted to receive and retain an annular coil or garter spring 56 in conventional manner. The spring 56 acts to bias the head section 24 and thus the lip edges 33, 37 of the sealing lip 26 constantly toward compressive sealing engagement with the sealing surface 40.

Figure 3:
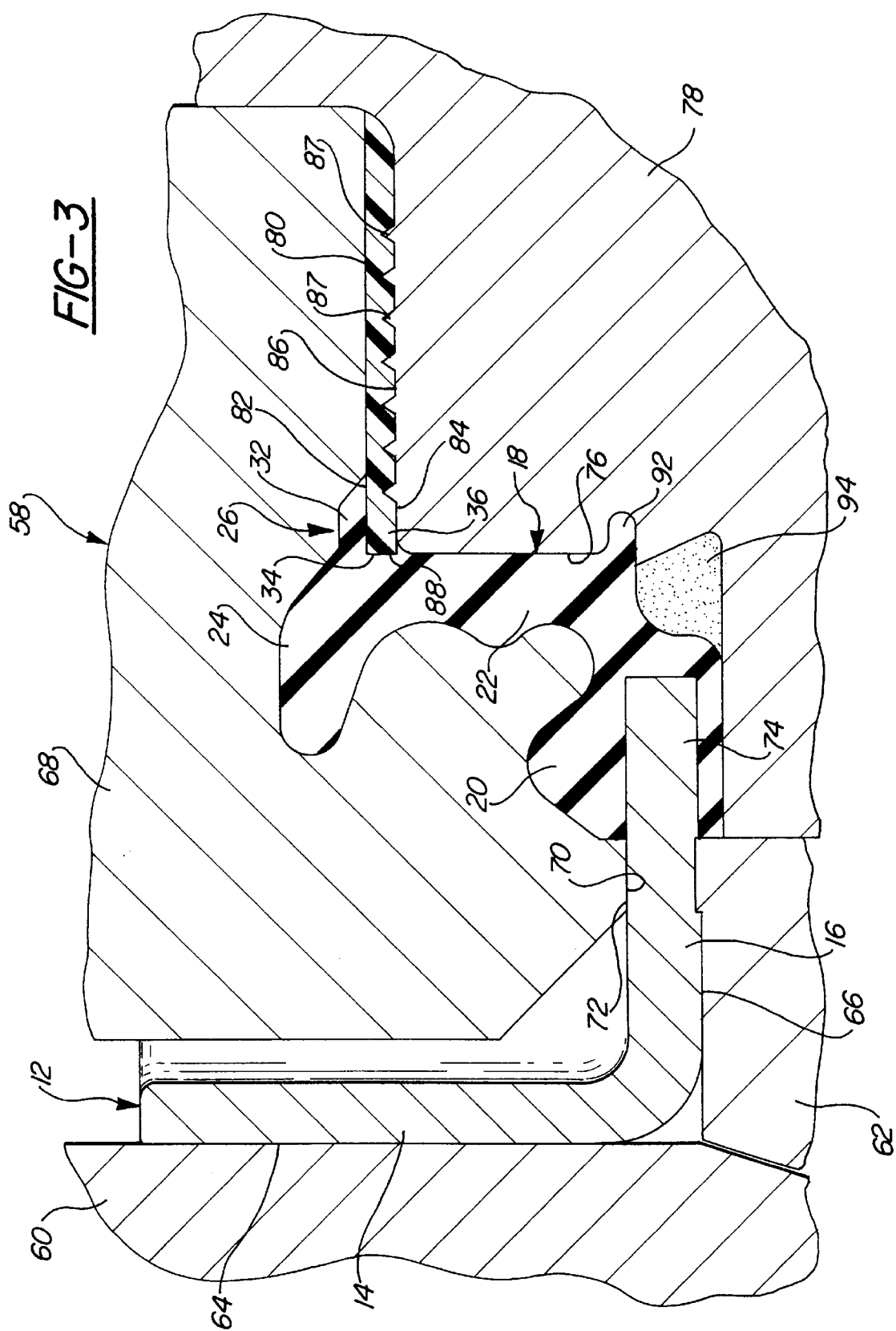
FIG. 3 is an enlarged fragmentary section view of a mold tool used in manufacturing the composite fluid seal of the invention.
Figure 4:
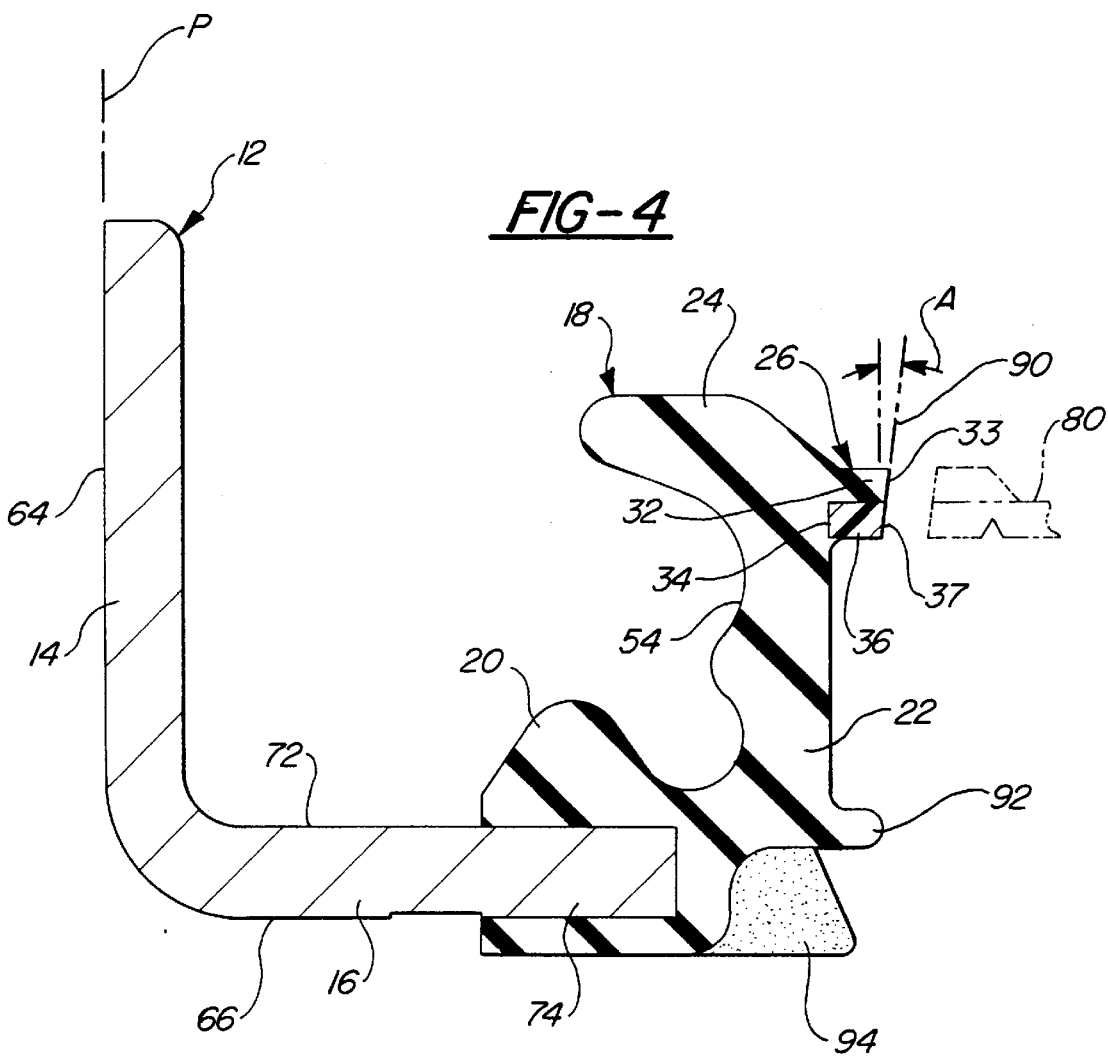
FIG. 4 is a further enlarged radial section view of the portion of the seal assembly formed in the mold tool of FIG. 3 shown in its as-molded and trimmed condition.

FIGS. 3 and 4 illustrate a method of manufacturing the seal assembly 10 of the invention. A multiple part mold tool 58 has parts 60, 62 thereof adapted to engage the outer surface 64 of the side wall 14 of the case 12 and the oil side surface 66 of the flange portion 16, respectively. An opposing upper mold part 68 has a surface 70 thereof adapted to engage the air side 72 of the flange portion 16 such that, when the mold parts are closed, the case 12 becomes firmly clamped in the mold tool with an extended portion 74 of the flange 16 projecting into a molding cavity 76 of the mold tool 58 provided between opposing contoured surfaces of the upper mold part 68 and that of a lower mold part 78.

With the mold tool 58 open, the case 12 is inserted and an annular washer or wafer 80 of the PTFE material, which preferably has been etched on at least its interface surface 38, is positioned in the mold 58 to serve as the insert 34 with the etched side 82 exposed and an opposite side 84 supported on an upper surface 86 of the lower mold part 78.

A ring of uncured elastomer is loaded in the cavity 76 of the mold tool 58, and the mold tool 58 thereafter closed, it being understood that the mold tool 58 is suitably heated prior to molding to cause the elastomeric material to flow and bond with the PTFE wafer 80. As shown in FIG. 3, the upper surface 86 of the lower mold part 78 is formed with a series of concentric ridges or teeth 87 which bite into the PTFE wafer 80 when the mold 58 is closed to support the wafer 80 against movement. The wafer 80 used in the process is of a simple, flat washer configuration with the opposite sides 82, 84 thereof being substantially parallel and planer. A shown in FIG. 3, the etched side 82 of the wafer 80 is exposed in the cavity 76, as is a small portion of the opposite side 84 and an outer edge 88 of the wafer 80.

Upon closing the mold 58, the uncured elastomer material is caused to flow and fill the unoccupied region of the cavity 76, and in doing so encapsulates the projecting portion 74 of the flange 16 of the case, and the projecting sides 82, 84 and edge 88 of the wafer 80. Following molding, the elastomer is heat cured in conventional manner to set the elastomer. The sealing lip 26 is then trimmed across the elastomeric and PTFE regions while in its free state (i.e., in its unflexed condition prior to engagement with the wear sleeve 42, illustrated by broken chain lines in FIG. 2) to provide the common, composite contact surface made up of the elastomeric and PTFE lip edges 33, 37 for simultaneously engaging the sealing surface 40 of the wear sleeve 42 when in an installed condition, as illustrated in solid lines in FIG. 2. It will be appreciated by those skilled in the art and from FIG. 2 that the sealing lip 26 is initially smaller in diameter than that of the wear sleeve 44 and upon installation with the wear sleeve 44 is caused to expand somewhat as the head 24 rotates radially outwardly upon flexing of the neck 22 about an angle of rotation B from the free state to the installed condition as the sealing lip 26 engages the sealing surface 40.

The trimming operation is illustrated schematically in FIG. 4, wherein after curing, the sealing member 18 is loaded in its free state in a fixture (not shown) with the pre-trimmed PTFE insert 34 and elastomer lip portion 32 supported generally horizontally and the elastomeric portion 32 facing upwardly. The trimming of the sealing lip 26 is along trim line 90 in FIG. 4, leaving the common coplanar lip edges of the elastomeric and PTFE portions 33, 37. The trim plane or line 90 is at an angle A that is determined in part by the angle of rotation B of the head 24 which may vary from one application to another. It is preferred, however, that the trim angle A be equal to or greater than the angle of rotation B of the head section 24, such that when the seal assembly 10 is installed, the elastomeric and PTFE lip edge portions 33, 37 sealingly engage the sealing surface 40 simultaneously, as illustrated in FIGS. 1 and 2. The trim angle A is selected to cause the elastomeric lip edge 33 to project radially inwardly slightly beyond that of the PTFE lip edge 37, such that when installed, the relatively softer elastomeric portion 33 is caused to be biased further toward engagement with the sealing surface 40 than that of the PTFE lip edge 37 and thereby is caused to wear during an initial break-in period at a rate greater than that of the relatively harder PTFE lip edge 37 until the elastomeric lip edge 33 is reduced to the diameter of the PTFE lip edge 37, at which point the portions 33, 37 will wear together at the slower rate of the PTFE material. In this way, the elastomeric lip edge portion 32 acts initially as a sacrificial seal, assuring that the PTFE lip edge 37 is protected from exposure to contaminants during the initial break-in period, and continues thereafter to protect the PTFE lip edge 37 from such contaminants during the service life of the seal 10 by wearing together with the PTFE lip edge portion 37. In the example shown, the trim angle A may be about 7° inwardly of an axial plane P of the axially extending side wall 14 to achieve the stated objectives.

The sealing member 18 further includes an annular projection 92 that is spaced radially from the sealing surface 40 of the wear sleeve 42 to provide, in conjunction with the wear sleeve 42, a labyrinth seal. Also formed on the oil side 30 of the sealing member 18 are hydrodynamic pumping flutes 94 of conventional type which may be molded integrally with the sealing member 18.

The end flange 52 of the wear sleeve 42 on the air side 28 of the assembly 10 may include a secondary annular sealing lip 96 in contact with the side wall 14 of the case 12 to assist in excluding contaminants from entering the interior of the seal assembly 10.

In operation, the wear sleeve 42 is press fit onto a shaft 48, such as the shaft or spindle of a large equipment wheel axle to provide a static seal therebetween, and the case 12 fit into a cup housing 100 of an adjacent component 102 such as a hub. The seal assembly 10 is oriented so that the air side 28 of the sealing lip 26 faces toward the exterior environment side of the seal, and the fluid side 30 faces axially inwardly toward the protected sealed area, such as the sealed region about a wheel bearing (not shown), with the seal 10 operating to protect the sealed bearing area from contaminants present on the air side 28 of the seal 10.

Obviously, many modifications and variations of the present invention are possible in light of the above teachings. It is, therefore, to be understood that within the scope of the appended claims wherein parenthetical reference numerals are merely for convenience and are not in any way to be limiting, the invention may be practiced as otherwise than as specifically described.

What is claimed is:

1. A fluid seal assembly for a relatively rotatable member having a cylindrical sealing surface, said assembly comprising:
    a rigid annular case (12);
    a sealing member (18) formed of elastomeric material fixed to said case (12) including an annular sealing lip (26) having a contaminated side (28) and an opposite side (30) and an elastomeric lip portion (32) disposed on said contaminated side (28); and
    characterized by said sealing lip (26) including an insert (34) formed of PTFE material having an inner surface (82) and an outer surface (84), said inner and outer surfaces (82, 84) being substantially planar and substantially parallel to one another, said inner surface (82) being bonded to said elastomeric lip portion (32) across a common bond interface (38) in axially adjacent relation thereto on said opposite side (30) of said sealing lip (26), said elastomeric lip portion (32) and said PTFE insert (34) having circumferentially continuous trimmed lip edges (33, 37) disposed in a common trim plane for simultaneous radially inwardly biased fluid-tight sealing engagement with a sealing surface (40) of a relatively rotatable member (42) and with said circumferentially continuous elastomeric lip edge (33) acting to seal said PTFE lip edge (37) from said contaminated side (28) when engaged with the sealing surface (40), said PTFE lip edge (37) intersecting said inner surface (82) and said outer surface (84) of said PTFE insert (34).

2. The assembly of claim 1 further characterized by including a unitized wear sleeve (42) having a cylindrical sealing surface (40) sealingly engaging said lip edges (33, 37) of said sealing lip (26).

3. The assembly of claim 1 further characterized by said PTFE material being relatively harder than that of said elastomeric material.

4. The assembly of claim 1 further characterized by said elastomeric lip portion (32) being free of permanently formed hydrodynamic surface configurations.

5. The assembly of claim 4 further characterized by said PTFE insert (34) having a modulus of elasticity relatively greater than that of said elastomeric material imparting reversible hydrodynamic surface deformations on said contaminated side (28) of said sealing lip (26) during operation of said assembly.

6. A unitized shaft seal assembly comprising:
    an outer metal case (12);
    an inner wear sleeve (42);
    a sealing member (18) having a body (20) formed of elastomeric material fixed to said case (12) and including a radially inwardly projecting annular sealing lip (26) having a contaminated side (28) and an opposite side (30) and an elastomeric lip portion (32) having an annular circumferentially continuous elastomeric lip edge (33) disposed on said contaminated side (28) in radially inwardly biased fluid-tight sealing engagement with said wear sleeve (42); and characterized by said sealing lip (26) including a PTFE insert (34) having an inner surface (82) and an outer surface (84), said inner and outer surfaces (82, 84) being substantially planar and substantially parallel to one another, said inner surface (82) being bonded to said elastomeric lip portion (32) across a common bond interface (38) having an annular circumferentially continuous PTFE lip edge (37) disposed on said opposite side (30) in simultaneous radially inwardly biased fluid-tight sealing engagement with said wear sleeve (42) and sealed from said contaminated side (28) by engagement of said elastomeric lip edge (33) with said wear sleeve (42), said PTFE lip edge (37) intersecting said inner surface (82) and said outer surface (84) of said PTFE insert (34).

7. The assembly of claim 6 further characterized by said wear sleeve (42) having a cylindrical sealing surface (40) sealingly engaging said lip edge portions (33, 37) of said sealing lip (26).

8. The assembly of claim 6 further characterized by said PTFE material being relatively harder than that of said elastomeric material.

9. The assembly of claim 6 further characterized by said elastomeric lip portion (32) being free of permanently formed hydrodynamic surface configurations.

10. The assembly of claim 9 further characterized by said PTFE insert (34) having a modulus of elasticity relatively greater than that of said elastomeric material imparting reversible hydrodynamic surface deformations on said contaminated side (28) of said sealing lip (26) during operation of said assembly.

11. A method of fabricating a fluid seal for a relatively rotatably member, comprising:

preparing an outer case (12);

fixing an elastomeric sealing member (18) of elastomeric material to the case (12) having an annular sealing lip (26) with a contaminated side (28) and an opposite side (30) and an elastomeric lip portion (32) disposed on the contaminated side (28); and characterized by providing an insert (34) formed of PTFE material having an inner surface (82) which is substantially planar and an outer surface (84) which is substantially planar and substantially parallel to said inner surface (82), and bonding the inner surface (82) to the elastomeric lip portion (32) across a common bond interface (38) in axially adjacent relation thereto to provide a PTFE lip portion (36) and trimming the elastomeric and PTFE lip portions (32, 36) to provide common axially adjacent circumferentially continuous elastomeric and PTFE lip edges (33, 37) disposed in a common trim plane and supported for simultaneous radially inwardly biased fluid-tight sealing engagement with the sealing surface (40) of the relatively rotatable member (42) with said elastomeric lip edge (33) sealing said PTFE lip edge (37) from said contaminated side (28) and with the PTFE lip edge (37) intersecting the inner and outer surfaces (82, 84) of the PTFE insert (34).

12. The method of claim 11 further characterized by molding the elastomeric lip portion (32) about at least three side of the PTFE insert.

13. The method of claim 12 further characterized by trimming the sealing lip (26) at an angle (A) such that the elastomeric lip edge (33) extends radially beyond the PTFE lip edge (37) when the lip edges are in a free state.

14. The method of claim 13 further characterized by trimming the sealing lip (26) at about a 7° angle with respect to an axially extending wall (14) of the outer case (12).

15. A shaft seal assembly comprising:

an annular case (12);

a sealing member (18) fabricated of elastomeric material fixed to said case (12) having an annular sealing lip (26) with an elastomeric lip portion (32) disposed on a contaminated side (28) of said sealing lip (26);

an insert (34) of PTFE material bonded to said elastomeric lip portion (32) across a common bond interface (38) in axially adjacent relation thereto on a protected side (30) of the sealing lip (26), with said PTFE material being relatively harder than said elastomeric material;

said elastomeric lip portion (32) and said PTFE insert (34) terminating radially inwardly at a common trimmed edge to provide circumferentially continuous elastomeric and PTFE lip edges (33, 37) disposed in a common trim plane and extending uninterrupted across said bond interface (38), said common trim plane of said lip edges (33, 37) being set at an angle such that when said shaft seal assembly is in an unstressed free state prior to installation on a sealing surface (40) of a relatively rotatable member (42), said elastomeric lip edge (33) is caused to extend radially inwardly beyond said PTFE lip edge (37).

16. The assembly of claim 15 wherein said trim plane is disposed at about 7° angle inwardly relative to an axial plane (P) of an axially extending wall (14) of said case.

17. The assembly of claim 15 wherein said elastomeric and PTFE lip edges (33, 37) are trimmed to have an unstressed diameter relatively smaller than the sealing surface on which they are mounted.

18. A method of fabricating a fluid seal for a relatively rotatable member, comprising:

preparing an outer case (12);

fixing an elastomeric sealing member (18) to the case having an annular sealing lip (26) with an elastomeric lip portion (32) disposed on a contaminated side (28) of the sealing lip (26);

providing an insert (34) of PTFE material having an inner surface (82) which is substantially planar and an outer surface (84) which is substantially planar and substantially parallel to said inner surface (82), and bonding the inner surface (82) to the elastomeric lip portion (32) across a common bond interface (38) therebetween in axially adjacent relation thereto to provide a PTFE lip portion 36; and trimming the elastomeric and PTFE lip portions (32, 36) of the sealing lip (26) at an angle (A) to provide axially adjacent, circumferentially continuous elastomeric and PTFE lip edges (33, 37) disposed in a common plane and at said angle (A) such that the elastomeric lip edge (33) extends radially beyond the PTFE lip edge (37) when the lip edges (33, 37) are in a free state, and such that upon installation on the relatively rotatable member (42) the elastomeric and PTFE lip edges (33, 37) are biased constantly inwardly into sealing engagement with a sealing surface (40) of the relatively rotatable member (42) and with the PTFE lip edge (37) intersecting the inner and outer surfaces (82, 84) of the PTFE insert (34).

* * * * *